United States Patent

[11] 3,554,232

[72] Inventors Frederick M. Kappel;
John G. Pecis, Wilmington, Del.
[21] Appl. No. 725,414
[22] Filed Apr. 30, 1968
[45] Patented Jan. 12, 1971
[73] Assignee Speakman Company
Wilmington, Del.
a corporation of Delaware

[54] MIXING FAUCET
4 Claims, 5 Drawing Figs.
[52] U.S. Cl. .................................................. 137/625.17,
264/263
[51] Int. Cl. ...................................................... F16k 11/08
[50] Field of Search ........................................... 137/375,
625.17, 625.68

[56] References Cited
UNITED STATES PATENTS
521,653  6/1894   Heyde .......................... 137/625.68
2,910,081 10/1959 Karbowniczek ............. 137/625.68
FOREIGN PATENTS
1,126,540 11/1956 France ......................... 137/625.68

Primary Examiner—M. Cary Nelson
Assistant Examiner—R. B. Rothman
Attorney—Connolly and Hutz ABSTRACT: A valve housing for a mixing faucet with molded surface waterways on the exterior of the housing and an integral sealing member surrounding the waterways for separating them. A method is also provided for producing the integral seal by introducing sealing material under pressure in the space between the surface waterways and the interior wall of a valve casing that snugly fits around the valve housing.

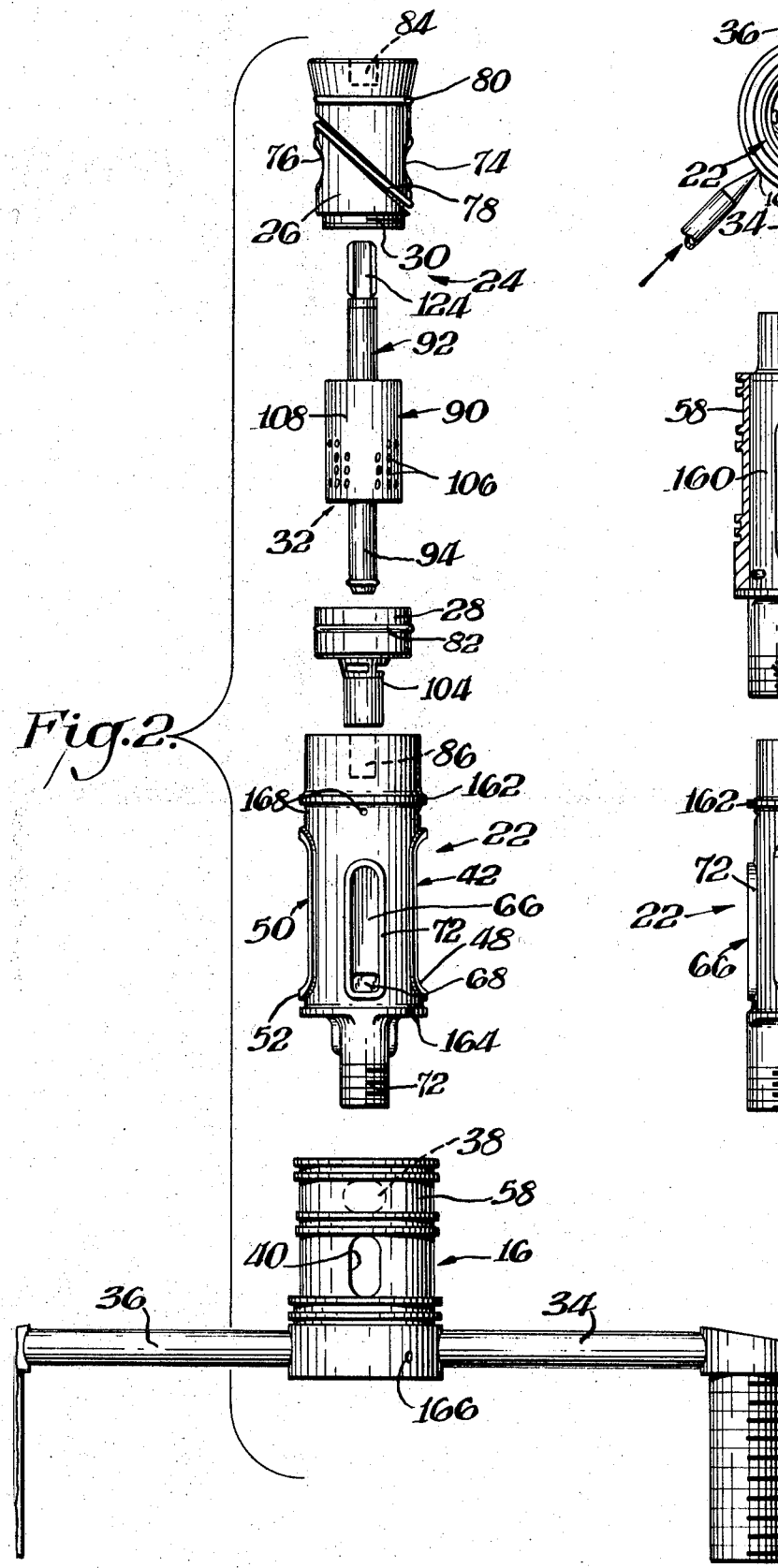

MIXING FAUCET

BACKGROUND OF THE INVENTION

The present invention relates to a valve housing for a mixing faucet as well as a method for sealing the surface waterways of the housing. More particularly, the valve housing has molded surface waterways and an integral seal surrounds the housing between the waterways.

Most mixing faucets include valve housings having waterways for channeling water to and from a mixing valve. The minimum size of such waterways was heretofore limited by the impractical size of sand cores or fabricated tubing. This resulted in large size valve housings with corresponding high cost. Sand core and fabricated waterways are also limited to rather simple geometric shapes. Leakage through such valve housings is not uncommon because of porous cast metal or fabricated joints of minimum integrity.

Accordingly, it is an object of the present invention to provide a valve housing for a mixing faucet which allows the formation of extremely small waterways and is more reliable and economical to produce.

Another object of the present invention is to provide a unique method for sealing the surface waterways in the valve housing of a mixing faucet.

SUMMARY OF THE INVENTION

In accordance with the present invention, a valve housing is provided comprising a body portion having a substantially hollow interior with spaced apart surface waterways on the exterior of the body portion. At least two of the waterways each have a discharge port that opens into the interior of the housing. An integral sealing member surrounds the body portion of the housing between the surface waterways for sealing the waterways from one another.

The exterior of the body portion includes a pair of spaced apart outwardly directed flanges that surround the body portion so that the surface waterways are disposed between the flanges. Raised rim portions surround the periphery of each surface waterway so that the sealing member occupies the area between the flanges and the raised rim portions.

The valve housing of the present invention is used in combination with a valve casing that surrounds the housing so that the interior wall of the casing snugly engages the flanges and the raised rim portions. Thus, the sealing member occupies the space between the interior wall of the casing and the body portion of the housing in the area between the flanges and the raised rim portions. The sealing member may be constructed of any catalytically activated material and the body portion of the housing molded of a thermoplastic or thermoset material.

The present invention also involves a method for sealing the surface waterways of a valve housing used in a mixing faucet comprising the steps of providing a valve housing with surface waterways and raised rim portions around the periphery of each waterway. The valve housing is assembled inside a valve casing so that the raised rim portions around the periphery of each waterway snugly engage the interior of the casing. Liquid sealing material is introduced into the space between the housing and the casing until the material fills the space around the surface waterways. Solidification of the liquid sealing material provides an integral sealing member that seals the surface waterways from one another.

The step of introducing the liquid sealing material involves introducing the material under pressure through an opening in the valve casing, and continuing the introduction of sealing material into the opening in the casing until the liquid sealing material seeps through a perforation in the valve housing. Such seeping indicates that the space between the housing and the casing is filled with sealing material.

BRIEF DESCRIPTION OF THE DRAWING

Novel features and advantages of the present invention in addition to those mentioned above will become apparent to one skilled in the art from a reading of the following detailed description in conjunction with the accompanying drawing wherein similar reference characters refer to similar parts and in which:

FIG. 2 is an exploded elevational view of several interior components of the mixing faucet shown in FIG. 1;

FIG. 3 is an elevational view of a valve housing for the mixing faucet shown in FIG. 1;

FIG. 4 is an elevational view of the valve housing inside a valve casing with portions broken away to diagrammatically illustrate the method for sealing the surface waterways of the housing; and FIG. 5 is a top plan view of the housing and casing shown in FIG. 4

DETAILED DESCRIPTION OF THE INVENTION

Figure 1:
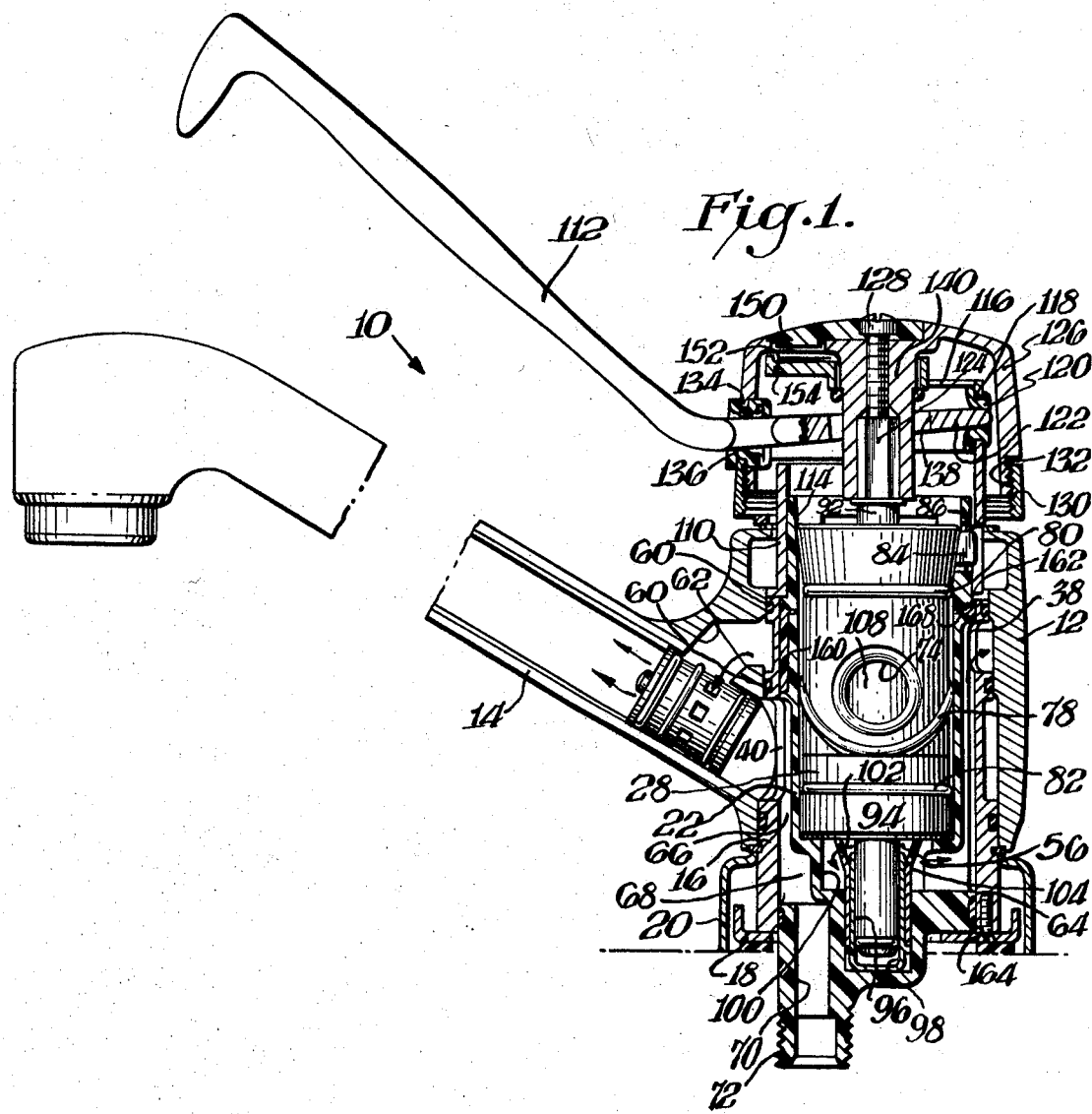
FIG. 1 is a sectional view of a mixing faucet according to the present invention.

The present invention involves a mixing faucet 10 having a generally cylindrical shell 12 with a spout portion 14 integrally connected to the shell. A cylindrical valve casing 16 is mounted inside the shell 12 as shown in FIG. 1, and the valve casing upon a mounting plate 18 connected to a sinkboard. An escutcheon 20 is provided at the lower end of the valve casing 16 for covering the lower portion of the casing as well as the mounting plate 18. A valve housing 22 molded of thermoplastic material such as polyformaldehyde (Delrin), for example, is mounted inside the valve casing 16. As explained more fully below, the valve housing includes molded surface waterways for channeling incoming and outgoing water.

A valve cartridge 24 is located inside the valve housing 22. The valve cartridge comprises a case having an upper section 26 and a lower section 28 connected together at 30. A valve element 32 is mounted for reciprocal and rotary motion inside the case of the valve cartridge. As explained more fully below, reciprocal and rotary movement of the valve element 32 regulates the temperature and volume of water flowing from the spout 14 when the faucet is open.

Turning now to FIG. 2, the cylindrical valve casing 16 may be constructed of metal alloys, such as brass, or thermoplastic materials, for example. A cold water conduit 34 is connected to the lower portion of the valve casing and a hot water conduit 36 is also secured to the lower portion of the casing, 180° from the conduit 34. The casing has a discharge outlet 38 for directing mixed water to the spout 14, as explained more fully below. Additionally, the valve casing 16 has a discharge port 40 for directing mixed water from the spout 14 to an auxiliary device, such as a spray attachment (not shown).

The valve housing 22 is mounted inside the valve casing 16. The housing is made of plastic material of the type mentioned above, and is easily produced by plastic molding and machining techniques. Moreover, the housing includes a body portion having a molded surface waterway 42 for channeling the incoming cold water in an upward direction to a port 44 that opens into the hollow interior of the housing where the valve cartridge 24 is located. The surface waterway 42 includes a raised peripheral rim 46 and a lower inclined portion 48 for directing the incoming cold water in an upward direction as it enters the waterway from the conduit 34. A similar molded surface waterway 50 is spaced 180° from waterway 42 and includes an inclined portion (not shown) at its lower end as well as a port (not shown) at its upper end for discharging hot water into the valve cartridge inside the valve housing. Like surface waterway 42, the hot waterway 50 is surrounded by a raised peripheral rim 52.

The valve housing 22 also includes a molded surface waterway 54 for channeling mixed water from the interior of the housing to the spout 14 of the faucet. In this regard, waterway 54 has a discharge port 56 at its lower end that provides communication between the interior and exterior of the housing. As best shown in FIGS. 1—3, waterway 54 communicates with the discharge port 38 in valve casing 16. Moreover, the valve casing has an annular channel 58 flanked by a pair of O-rings 60 positioned between the valve casing 16 and the shell 12 of the faucet. Thus, as explained more fully below, mixed water emptying from the bottom of the valve housing is channeled into the waterway 54 through the opening 56 and then upwardly to the discharge port 38 in the valve casing 16. As the mixed water empties into the annular channel 58 it flows around the channel to a branch line 62 that connects the channel to the spout 14 of the mixing faucet. Waterway 54 is also surrounded by a peripheral rim 64.

The valve housing 22 further includes a fourth molded surface waterway 66 for channeling mixed water from the spout 14 to an auxiliary device, such as a spray attachment. The surface waterway 66 has a discharge port 68 at its lower end which opens into a line 70 that serves to connect the spray attachment to the faucet. The line 70 is an integral portion of the valve housing 22 and includes external threads 72 to facilitate connection of the spray attachment to the housing. As can readily be understood, when the valve attached to the spray at its discharge end is opened water flowing through the faucet is channeled into the upper portion of the surface waterway 66 from the lower end portion of the spout 14 which is in line with that waterway. The mixed water simply flows down the waterway 66 into the discharge port 68 and then into the line 70. Waterway 66 is also surrounded by a peripheral rim 72.

As explained above, the interior of the valve housing 22 carries the valve cartridge 24. The lower case section 28 is seated in the bottom of the housing, as shown in FIG. 1, and the upper section 26 is accurately positioned inside the housing 22 so that a pair of opposed ports 74, 76 in that section of the case are in alignment with the discharge ports in the cold and hot surface waterways 42, 50 of the valve housing. The ports 74, 76 are sealed from one another by a diagonal O-ring 78, and O-rings 80, 82 are also provided between the case and housing above and below the ports 74, 76. Accurate alignment of the ports 74, 76 with the discharge ports in the cold and hot surface waterways 42, 50 is accomplished by a lateral projection 84 on the upper case section 26 that enters a slot 86 in the upper portion of the valve housing 22.

As mentioned above the valve cartridge 24 includes the valve element 32 mounted for reciprocal as well as rotary motion. The valve element comprises a cylinder 90 connected to a valve stem 92 having a lower end portion 94 seated within a bushing 96 mounted in a recess 98 in the lower portion of the valve housing 22. The valve stem extends through an opening in the lower case section 28 which is somewhat larger than the diameter of the stem so that mixed water can empty into a compartment 100 in the housing below the lower case section 28. As mixed water empties into the compartment 100 it flows through openings 102 in a sleeve 104 that functions to prevent the bushing 96 from moving in an upward direction when the valve element 32 moves upwardly.

A plurality of openings 106 are arranged in the cylinder 90 of the valve element 32 in a predetermined manner. Under flow conditions the openings are in alignment with the cold and hot ports 74, 76 in the upper case section 26. When the valve element is positioned at the lower extent of its downward motion the cold and hot ports 74, 76 are closed by an imperforate upper portion 108 of the cylinder 90. However, when the valve element is positioned upwardly relative to the case, the openings 106 in the cylinder communicate with the ports 74, 76 in the upper case section 26. Rotation of the cylinder, as explained below, provides various combinations of hot and cold water including all hot and all cold. This is accomplished by aligning selected openings in the cylinder with the ports 74, 76. Moreover, the volume of water flowing through the faucet is regulated by the position of the cylinder 90 relative to the ports 74, 76. In this regard, water flow increases to a maximum as the cylinder moves to the maximum extent of its upward travel.

A sleeve 110 is provided for mounting a handle 112 to the faucet 10. The sleeve is force fitted onto the upper portion 114 of the valve housing 22 and includes an elevated arcuate segment 116 having an elongate slot 118 therein. The elongate slot is surrounded by a gasket 120 and receives the back end 122 of the handle 112. The upper end 124 of the valve stem 92 is connected to a cap 126 anchored to the stem by a machine screw 128. The cap includes a skirt portion 130 threadably connected at 132 to the main portion of the cap. Additionally, the cap has a handle receiving opening 134 with a gasket 136 surrounding the opening. Moreover, the back end of the handle 112 has a circular opening 138 and the central column 140 of the cap 126 extends through the opening. The central column 140 fits over the upper end 124 of the valve stem 92, as shown in FIG. 1. Thus, when the front end of the handle 112 is raised the valve stem 92 moves upwardly and the perforations 106 in the cylinder 90 of the valve element 32 communicate with the ports 74, 76 in the upper case section 26. Raising and lowering the handle regulates the volume of flow through the faucet and when the handle is in its uppermost position the flow is at a maximum since the maximum number of perforations in the cylinder are in communication with the ports 74, 76. Movement of the handle 112 to the right or left varies the ratio of perforations in the cylinder 90 that are in communication with the cold and hot ports 74, 76. Thus, various water mixtures are obtained through such movement of the handle. Finally, when the handle is in its lowermost position, as illustrated in FIG. 1, the ports 74, 76 are closed by the upper imperforate portion 108 of the cylinder 90.

The cap 126 of faucet 10 also includes a clear plastic insert 150 secured thereto by the machine screw 128, as shown in FIG. 1. An indicia carrying plate 152 is mounted directly below the clear plastic insert by a support 154 fixed to the elevated arcuate segment 116 of the handle mounting sleeve 110. Accordingly, as the handle is moved to the right or left various water mixtures printed on the plate 152 are readily visible through the clear plastic insert 150.

The various surface waterways molded in the valve housing 22 are separated from one another by an integral seal 160. The seal is located between the waterways and upper and lower annular flanges 162, 164 on the body of valve housing 22 above and below the waterways. In this regard, when the housing is properly inserted into the cylindrical valve casing 16 the raised rim portions surrounding each of the waterways as well as the annular flanges 162, 164 snugly engage the interior wall of the valve casing 16. An opening 166 in the lower portion of the valve casing 16 just above the lower annular flange 164 provides an inlet for fluid sealing material. The fluid sealing material is pumped into the inlet 166 under pressure and flows into the space between the raised rims around the molded surface waterways, the annular flanges 162, 164, the housing body and the interior wall of the cylindrical valve casing 16. Fluid sealing material is pumped into this space until it emerges from several perforations 168 located in the valve housing 22 directly below the upper annular flange 162. Once this occurs, pumping of the fluid sealing material is terminated and the fluid is allowed to solidify. As can readily be understood, the solidified seal 160 functions to separate the various molded surface waterways from one another to prevent leakage. Catalytically activated sealing materials such as polysulfide, for example, may be used to seal the waterways. Epoxy is a good sealing material. As is the case with these materials the sealant should adhere to the surface of the casing and/or housing. Curing of the material by chemical reaction is preferred over air curing because the space between the casing and housing is relatively airtight.

We claim:

1. A valve housing comprising a body portion having a substantially hollow interior, a pair of spaced apart outwardly directed flanges on the exterior of the body portion completely surrounding the body portion, spaced apart surface waterways on the exterior of the body portion located between the pair of outwardly directed flanges, a raised rim portion around the periphery of each surface waterway, and a single integral sealing member surrounding the body portion of the housing and completely occupying the area between the outwardly directed flanges and the raised rim portions for sealing the waterways from one another.

2. A valve housing as in claim 1 and a valve casing around the housing having an interior wall that snugly engages the flanges and the raised rim portions, the sealing member occupying the space between the interior wall of the casing and the body portion of the housing in the area between the flanges and the raised rim portions.

3. A valve housing as in claim 1 wherein the body portion is molded of plastic material.

4. A valve housing as in claim 1 containing at least one opening therein whereby sealing material can be observed leaving the opening when the area between the outwardly directed flanges and the raised rim portions is filled with sealing material.